United States Patent

Yuo et al.

[11] Patent Number: 5,891,987
[45] Date of Patent: Apr. 6, 1999

[54] COPOLYAMIDE COMPOSITION WITH A HIGH GLASS TRANSITION TEMPERATURE

[75] Inventors: Wu-Bin Yuo, Hsinchu; Chien-Shiun Liao, Taichung; Wen-Jeng Lin, Hsinchu; Li-Kuei Lin; Tien-San Lee, both of Hsinchu Hsien; Szu-Yuan Chan, Hsinchu, all of Taiwan

[73] Assignee: Industrial Technology Research Institute, Hsinchu, Taiwan

[21] Appl. No.: 559,391

[22] Filed: Nov. 15, 1995

[51] Int. Cl.⁶ .................................................. C08G 69/26
[52] U.S. Cl. .......................... 528/388; 528/310; 528/339; 528/340; 528/344; 528/347; 525/432
[58] Field of Search ...................... 528/310, 338, 528/339, 340, 344, 347; 525/432

[56] References Cited

U.S. PATENT DOCUMENTS

| | | | |
|---|---|---|---|
| 3,926,924 | 12/1975 | Edgar et al. | 528/339 |
| 4,218,509 | 8/1980 | Edgar et al. | 528/339 |
| 4,246,395 | 1/1981 | Mortimer | 528/208 |

*Primary Examiner*—Duc Truong
*Attorney, Agent, or Firm*—W. Wayne Liauh

[57] ABSTRACT

A copolyamide composition prepared from hexamethylene diamine and either mixtures of adipic acid and terephthalic acid, or mixtures of adipic acid, terephthalic acid and isophthalic acid, has a melting point below 320° C., a glass transition temperature between 100° C. and 120° C. and physical properties similar to nylon 66.

8 Claims, No Drawings

COPOLYAMIDE COMPOSITION WITH A HIGH GLASS TRANSITION TEMPERATURE

BACKGROUND OF THE INVENTION

1. Field of the Invention

The present invention relates to copolyamides from aliphatic diamines, particularly hexamethylene diamine and either mixtures of adipic acid and terephthalic acid, or mixtures of adipic acid, terephthalic acid and isophthalic acid. In particular, it relates to copolyamides having a melting point($T_m$) below 320° C., a glass transition temperature($T_g$) between 100° C. and 120° C., and mechanical properties similar to nylon 66.

2. Description of the Prior Art

100% hexamethylene terephthalamide(6T) polymer has a high $T_g$ and also a $T_m$ (about 370° C.) too high for it to be melt processed. While replacing a portion of the terephthalic acid with isophthalic acid lowers the $T_m$ while preserving the high $T_g$, the resulting 6T/6I (hexamethylene terephthalamide hexamethylene isophthalamide) copolymer has less crystallinity. Accordingly, copolyamides obtained from 66 (hexamethylene adipamide), 6T, and 6I in various ratios have been developed and applied in different industrial fields. For example, Japan Patent No. 46-18809 (71018809) discloses a copolyamide obtained from 10–50 wt% of hexamethylene adipamide(66), 10–50 wt% of hexamethylene terephthalamide (6T) and 10–55 wt% of hexamethylene isophthalamide (6I). The copolyamides are suitable for use as fibers.

Japan Laid open Patent No. 52-85516 (77085516) discloses a copolyamide fiber which is obtained from 20–70 wt% of hexamethylene adipamide(66), 15–45 wt% of hexamethylene terephthalamide (6T) and 15–35 wt% of hexamethylene isophthalamide (6I).

Japan Patent No. 46-28218 (71028218) discloses a complex polyamide fiber which is manufactured from a copolyamide prepared from 10–80 wt% of hexamethylene adipamide(66), 10–50 wt% of hexamethylene terephthalamide (6T) and 10–55 wt% of hexamethylene isophthalamide (6I).

U.S. Pat. No. 4,238,603 discloses a copolyamide fiber which is obtained from 2–15 wt% of hexamethylene adipamide, 45–68 wt% of hexamethylene terephthalamide, and 30–40 wt% of hexamethylene isophthalamide.

Japan Pat. No. 68-067801 discloses a fiber prepared from a copolyamide consisting of 10–80 wt% of hexamethylene adipamide, 10–65 wt % of hexamehtylene terephthalamide, and 10–55 wt% of hexamethylene isophthalamide.

U.S. Pat. No. 4,218,509 discloses a copolyamide fiber which is manufactured from at least 50 wt% of hexamethylene adipamide, 20–40 wt% of hexamethylene terephthalamide, and 2–20 wt % of hexamethylene isophthalamide.

U.S. Pat. No. 4,521,484 discloses the synthesis of copolyamide filaments which are manufactured by using at least 60 wt% of hexamethylene adipamide, 15–30 wt% of hexamethylene isophthalamide and 5–10 wt% of hexamethylene terephthalamide.

U.S. Pat. No. 4,603,166 and U.S. Pat. No. 4,603,166 disclose crystalline copolyamides having high heat deflection temperature, which are prepared from hexamethylene diamine, adipic acid, terephthalic acid and isophthalic acid at a mole ratio of about 100:5–35:65–95: 0–25.

U.S. Pat. No. 4,246,395 discloses a fiber-forming polyamide consisting of 5–20 wt% of hexamethylene adipamide, 40–75 wt% of hexamethylene terephthalamide and 20–40 wt% of hexamethylene isophthalamide. The fiber-forming polyamide has a melting point below 320° C., a glass transition temperature above 115° C. and good thermal stability.

U.S. Pate. No. 4,268,661 discloses copolyamides having a glass transition temperature of 140° C.–170° C. The copolyamides are suitable as engineering plastics and are manufactured from 0–15 mole% of hexamethylene adipamide, 0–50 mole % of hexamethylene terephthalamide and 50–100 mole% of hexamethylene isophthalamide.

Japan Patent Nos. 60-32980(94-32980) and 60-32979(94-32979) disclose crystalline polyamides for injection molding. The polyamides comprise 30–95 wt% of hexamethylene adipamide, 0–40 wt% of hexamethyene terephthalamide, and 5–30 wt% of hexamethylene isophthalamide.

Japan Patent No. 31-26725 discloses aromatic copolyamides which are produced by polymerizing adipic acid, terephthalic acid, isophthalic acid and hexamethylene diamine in the presence of sodium hypophosphite.

Japan Patent No. 3007761 discloses polyamides prepared from (a) a dicarboxylic acid consisting of 0–70 mole% of adipic acid, 30–100 mole % of terephthalic acid, and 0–40 mole % of isophthalic acid and (b) hexamethylene diamine. The polyamides thus prepared are highly resistant to heat, water and chemicals and have high mechanical strength.

German Patent DE 3506656(1986) discloses copolyamides prepared from adipic acid, terephthalic acid, isophthalic acid and hexamethylene diamine with a weight ratio of adipic acid to mixture of terephthalic acid and isophthalic acid of 30–51:48.5–70. The weight ratio of terephthalic acid to isophthalic acid is 48.5–60:40–51.5. The copolyamides have higher $T_g$ and lower water absorption.

European Patent No. 121984 discloses a copolyamide comprising (A) hexamethylene adipamide, (B) hexamethylene terephthalamide and (c)hexamethylene isophthalamide wherein the mole ratio of the dicarboxylic acid moieties in (A), (B) and (C) is 5–35:5–35:60–90. An injection molding composition comprising the above copolyamides and 10–60 wt% of glass fibers or beads and/or mineral or graphite fibers has a heat deflection temperature of 240° C.–305° C.

Japan Laid Open Patent No. 6-287299 discloses a continuous process for preparing copolyamides. The copolyamides comprise the following recurring units:

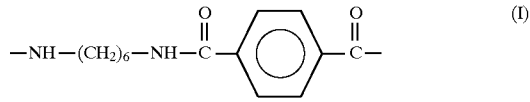

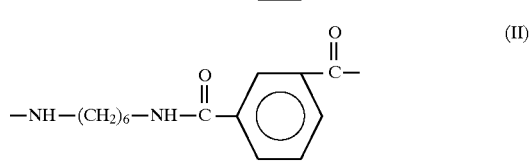

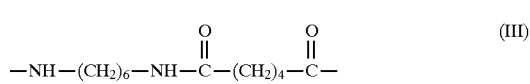

wherein the weight ratio of (I)/(II) is 55–80/20–45, (I)/(III) is 20–80/20–80 and (I)/(IV) is 55–90/10–45. The copolyamides are heat resistant and have lower water absorption.

Japan laid open Patent No. 06-287,300 discloses a copolyamide comprising the same recurring units (I), (II), (III) and (IV) and having the same weight ratio of (I)/(II), (I)/(III) and (I)/(IV). The copolyamide is crystalline and heat resistant.

European Patent No. 0 409 666 A2 discloses a polyamide composition comprising the following recurring units:

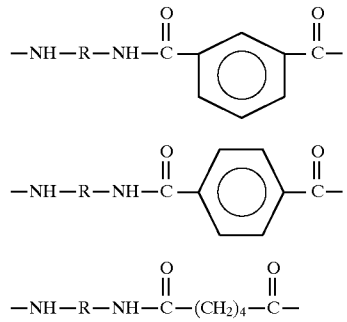

wherein the mole ratio of the dicaroxylic acid moieties in the A, B, and C units is about 0.5–49.5/0–20/0.5–49.5 and wherein R is a divalent radical comprising

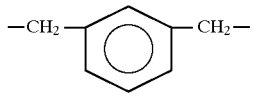

and —(CH$_2$)$_6$— in a mole ratio of about 0.5–50/49.5–0. The polyamide compositions have a glass transition temperature of 90° C. or greater and an oxygen transmission rate of about 2.0 cc-mil/100 in$^2$-day-atm or less.

European Patent No. 0 291 096 discloses a novel crystalline copolyamide having high heat deflection temperature. The copolyamide comprises the following recurring moieties:

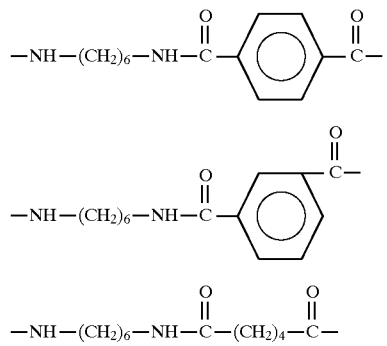

wherein the mole ratio A:B:C is 60–90:35–5: 35–5.

SUMMARY OF THE INVENTION

It is an object of the invention to provide a copolyamide having a melting point($T_m$) below 320° C., a glass transition temperature($T_g$) of 100°–120° C., and mechanical properties similar to nylon 66.

The object of the invention is attained by providing a copolymaide comprising the following recurring units:

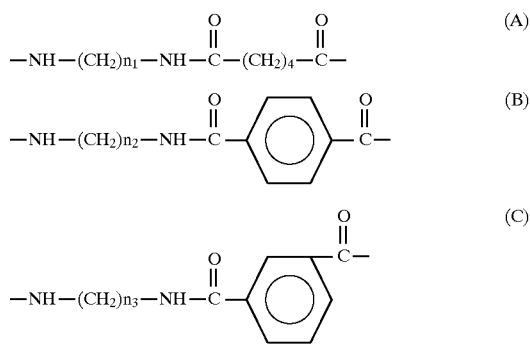

wherein the mole ratio of the dicarboxylic acid moieties in the (A), (B), (C) units is 30–70:30–60:0–20, and $n_1$, $n_2$ and $n_3$ are integer of 2–14.

The copolyamides of the invention can be used as engineering plastics. For example, they can be processed in usual plastic machines, e.g. injection molding apparatus, extruder to form molded objects or laminates to be used in the production of automobile parts, gears, bearings, and electronic and electrical parts, and casters etc. The copolyamides are also suitable for being spun into fibers, and filaments.

DETAILED DESCRIPTION OF THE INVENTION

The preparation of the copolyamides of the invention can be carried out in two steps. In the first step, a polyamide prepolymer is prepared in a stirred reactor which are suitable for processing materials of high viscosity. Feed materials consisting of dicarboxylic acids (terephthalic acid, adipic acid and isophthalic acid in the desired ratios), diamines (as commonly used herein aqueous hexamethylene diamine), and any additives are charged to the reactor at an external temperature of about 150° C. The water content is about 5 to 25 percent by weight based on the total amount of the reactants. The reactor is then purged with nitrogen gas or other inert gas and the polymerization mixture is then raised to between about 240° C. to 310° C. During the preparation process, the pressure, principally steam pressure is maintained between 4–5 kg/cm$^2$. Once the water formed during the prepolymerization process reaches about 30% of the total water amount, the pressure is reduced to about 1 kg/cm$^2$ over a period of 3 to 30 minutes. The prepolymer is then allowed to flow out of the reactor into iced water, and collected.

The second step is the final polycondensation and can utilizes either a conventional stirred reactor or a twin-screw extruder reactor (the so-called reactive extrusion method). The final polycondensation step, when using a conventional stirred reactor, is conducted at an external temperature of about 360° C. and a vacuum of about 70 cm-Hg. The final polycondensation step, when using a twin-screw extruder as a reactor, has good heat conductivity, can obtain extensive agitation and provide multi-stage heating, evacuating and venting during the reaction, and thus enables continuous polycondensation in a shorter reaction time and allows these high melting resins to be easily handled. The reactive extrusion method is conducted at a temperature of from 240°–280° C. and a vacuum of about 60 cm-Hg.

The invention will now be described in greater detail with reference to the following non-limiting examples.

EXAMPLE 1

A. preparation of prepolymers

A 2-liter reactor fitted with a stirrer was cleaned and purged with nitrogen gas. 120 g of hexamethylene diamine (HMDA) was dissolved in a 70° C. water bath and distilled water was added to the dissolved HMDA. The amount of the distilled water was 17 percent by weight of the dissolved HMDA. The mixture was then poured into the reactor and then a suitable amount of adipic acid (AA) (the mole ratio of AA HMDA was 1:1.03) and 0.1 percent by weight of sodium hypophosphite was added.

The reactor was then purged five times with nitrogen gas. Thereafter, the external temperature of the reactor was first set at 230° C., then raised to 250° C. after 10 minutes and maintained for 30 minutes, and then raised to 280° C. and maintained for 30 minutes and subsequently raised to 310° C. and maintained for 30 minutes, and finally raised to 340° C. During the heating process, the pressure was maintained at 4–5 kg/cm$^2$.

When the water amount formed reached 60 ml (about 30 % of the total water amount), the pressure was reduced to 1 kg/cm$^2$. At that time, the total water amount formed was 75 ml( 70% of the total water amount). The prepolymer thus formed was then allowed to flow out into ice water.

B. preparation of the final polyamide

A steel tube immersed in a tin liquid heated to 360° C. was used as a reactor for this step. 0.5–1 g of dried prepolymer was placed in the steel tube, and the steel tube was placed in the tin liquid under a vacuum of 70 cm-Hg. When the internal temperature of the steel tube reached a temperature 20° C. lower than the melting point of the sample, the steel tube was taken out and placed in ice water for cooling. When the temperature of the steel tube fell below 100° C., the resulting polyamide sample was taken out for analysis.

C. measurement of the relative viscosity of the sample polyamide

The viscosity of the resulting polyamide was measured in a Cannon #150 three-opening viscosmeter immersed in a thermostat. The temperature of the thermostat was maintained at 30°±0.1° C., the solvent used was phenol tetrachloroethane(6/4 w w), and the concentration of the polyamide was 0.5 g/dl. The relative viscosity (R.V.) was 1,0–1.5.

D. measurement of Tg by Rehovibron analysis

1–5 g of dried polymer was compressed into a film of 0.005–0.01 cm by a hot press. The film was then cut into test strips(3–4 cm×0.3 cm). Each test strips was heated from room temperature to 200° C. at a rate of 2° C./min and the frequency was set at 11 Hz. The $T_g$ of each test strips was recorded and shown in Table 1.

E. measurement of $T_m$ by D.S.C. analysis

6–8 mg of sample was prepared and first heated from room temperature to 300° C. in a D.S.C. at a heating rate of 20° C./min. When the temperature reached 300° C., the sample was cooled to room temperature at a cooling rate of 5° C./min, and then heated to 350° C. at a rate of 20° C./min. $T_m$ was recorded and shown in Table 1.

EXAMPLE 2

The same procedures were used as in Example 1, except that the adipic acid(AA) was replaced with a mixture of adipic acid, terephthalic acid(TA) and isophthalic acid(IA) having a mixing ratio as indicated in Table 1. The synthesized copolyamides all had a R.V larger than 1.6, and their Tg and Tm are summarized in Table 1 below.

TABLE 1

| Diacid composition | mole ratio | $T_g$(°C.) | Tm(°C.) |
|---|---|---|---|
| AA | 100 | 70 | 265 |
| AA/TA | 60/40 | 105 | 278 |
| AA/TA | 50/50 | 112 | 306 |
| AA/TA/IA | 50/45/5 | 112 | 282 |
| AA/TA/IA | 45/45/10 | 115 | 275 |
| AA/TA | 40/60 | 108 | 325 |
| AA/TA/IA | 30/45/15 | 118 | 287 |

EXAMPLE 3

A. preparation of prepolymers

The same procedures of Example 1 and Example 2 were used, except that the reactor was changed to a 50-liter reactor to obtain three prepolymers in which the first prepolymer was prepared from AA and HMDA, the second prepolymer was prepared form HMDA and a mixture of AA/TA/IA having a mixing ratio of 50/45/5, and the third prepolymer was prepared from HMDA and a mixture of AA/TA having a mixing ratio of 60/40.

B. preparation of the final copolyamides

In this example, a twin-screw extruder reactor was used to prepare the final copolyamides. The three prepolymers were dried, pulverized and then fed into a twin-screw extruder, the Zawa 45 mm extruder. The process conditions employed in the twin-screw extruder are presented in Table 2 below.

TABLE 2

| Screw Speed (rpm) | Zone temperature (°C.) | | | | | | | | Zone vacuum degree (cm-Hg) | | | Die temp. (°C.) |
|---|---|---|---|---|---|---|---|---|---|---|---|---|
| | 1 | 2 | 3 | 4 | 5 | 6 | 7 | 8 | 1 | 2 | 3 | |
| 180 | 120 | 240 | 265 | 273 | 290 | 280 | 278 | 270 | 60 | 60 | 60 | 270 |

C. Measurements of $T_m$ and $T_g$ $T_m$ and $T_g$ of the resulting copolyamides were measured by the same procedures as used in Example 1, and the results are summarized in Table 3.

D. Measurement of physical properties

Test specimens were prepared by using a single-screw injection molding machine (Niigata-Stubba). The process conditions of the preparation are summarized below.

diameter of the screw: 30 mm
barrel temperature: 255° C.–256° C.
nozzle temperature: 274° C.
molding temperature: 110° C.
injection pressure: 3 kg/cm$^2$
keep pressure time: 10 sec
cooling time: 50 sec
mold open time: 1.2 sec
screw speed: 100 rpm The tensile strength, flexural strength and flexural modulus of the test specimens were tested in accordance with ASTM-D638, and the results are summarized in Table 3 below.

TABLE 3

| Composition of diacid | AA | AA/TA/IA | AA/TA |
|---|---|---|---|
| mole ratio | 100 | 50/45/5 | 60/40 |
| Tensile strength (kg/cm$^2$) | 750 | 910 | 878 |
| Flexural strength (kg/cm$^2$) | 1200 | 1330 | 1276 |
| Flexural modulus (kg/cm$^2$) | 27,000 | 29684 | 28820 |
| Tg (°C.) | 45 | 112 | 105 |
| Tm (°C.) | 265 | 282 | 278 |

As can be seen from Table 3, the copolyamide of the invention has a Tm of less than 300° C., a Tg between 100°–120° C. and equally good or better mechanical properties than nylon 66.

What is claimed is:

1. A copolyamide composition consisting essentially of the following recurring units:

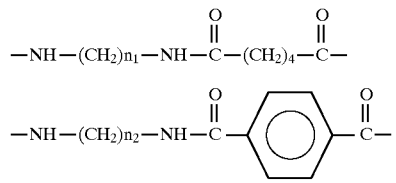

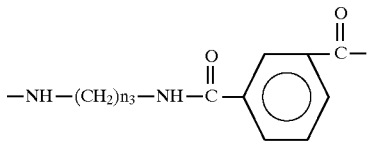

wherein the mole ratio of the dicarboxylic acid moieties in the (A), (B), (C) units is 30–60:40–60:0–20, and $n_1$, $n_2$, and $n_3$ are integers between 2 and 14 further wherein said copolyamide has a glass transition temperature, $T_g$, between 100° and 120° C.

2. The copolyamide composition as claimed in claim 1, wherein the mole ratio of the dicarboxylic acid moieties in the (A), (B) and (C) units is 35–60:40–55:0–15.

3. The copolyamide composition as claimed in claim 1, wherein the mole ratio of the dicarboxylic acid moieties in the (A), (B) and (C) units is 50–60:40–50:0–10.

4. The copolyamide composition as claimed in claim 1, wherein $n_1$, $n_2$ and $n_3$ are respectively 6.

5. An engineering plastic comprising the copolyamide of claim 1.

6. A fiber comprising the copolyamide of claim 1.

7. A laminate comprising the copolyamide of claim 1.

8. The copolyamide composition as claimed in claim 1 which has a melting point lower than 320° C.

* * * * *